No. 730,299. PATENTED JUNE 9, 1903.
F. S. ROBINSON.
DEVICE FOR GROOVING OR TAPPING RUBBER OR OTHER SAP YIELDING TREES.
APPLICATION FILED SEPT. 2, 1902.
NO MODEL. 2 SHEETS—SHEET 2.
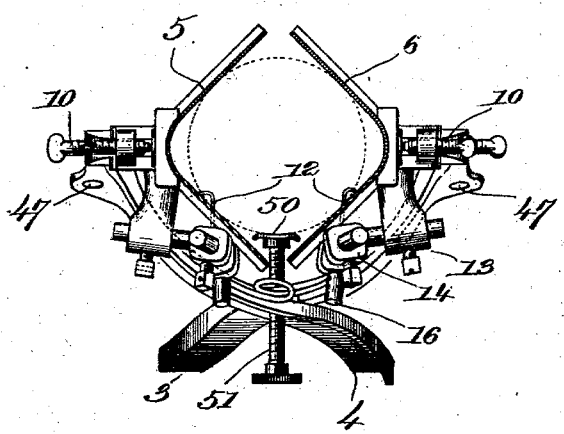
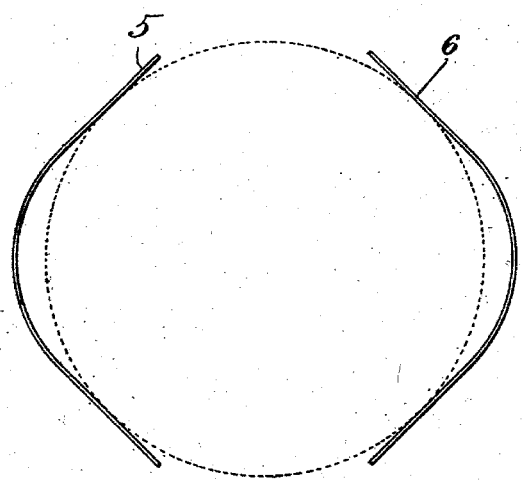
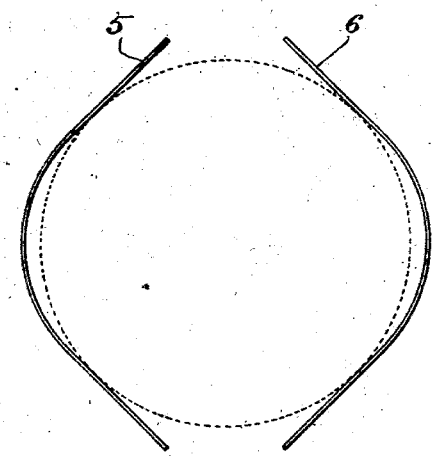

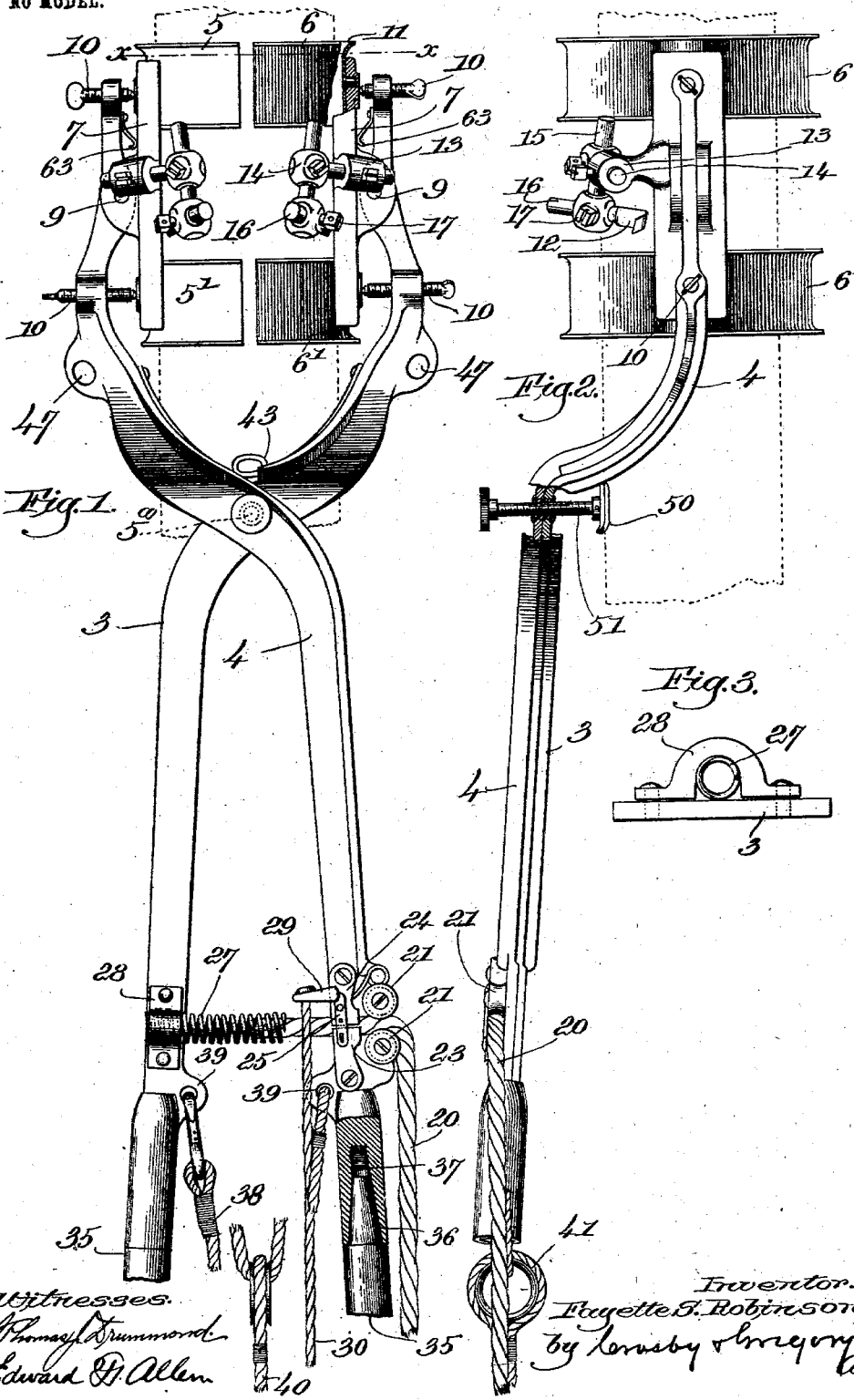

No. 730,299. Patented June 9, 1903.

UNITED STATES PATENT OFFICE.

FAYETTE S. ROBINSON, OF BOSTON, MASSACHUSETTS, ASSIGNOR TO FERDINAND E. BORGES, OF BROOKLINE, MASSACHUSETTS.

DEVICE FOR GROOVING OR TAPPING RUBBER OR OTHER SAP-YIELDING TREES.

SPECIFICATION forming part of Letters Patent No. 730,299, dated June 9, 1903.

Application filed September 2, 1902. Serial No. 121,782. (No model.)

*To all whom it may concern:*

Be it known that I, FAYETTE S. ROBINSON, a citizen of the United States, residing at Boston, county of Suffolk, State of Massachusetts, have invented an Improvement in Devices for Grooving or Tapping Rubber or other Sap-Yielding Trees, of which the following description, in connection with the accompanying drawings, is a specification, like numerals on the drawings representing like parts.

Certain sap-yielding trees, the sap of which is used for different purposes, are commonly tapped by cutting or slashing a channel or groove in the bark thereof, into which the sap collects, and which conducts the sap to the point in the groove from which it may be conveniently gathered.

It is the object of my invention to provide a novel device for forming or cutting the sap-collecting groove in the sap-yielding trees which is simple in construction and easily manipulated and capable of such adjustment that grooves having any desired direction and shape may be cut.

The invention comprises a device having a pair of jaws which are adapted to embrace or partially embrace the trunk of the tree to be tapped, and a channeling or grooving knife which operates to cut the desired channel or groove in the bark of the tree as the jaws are moved thereover.

In the preferred embodiment of my invention the device comprises a tongs-like structure having two arms pivoted together between their ends and each having at one end a head, to which a jaw is secured. The other ends of the arms constitute handles, by means of which the instrument may be manipulated and the jaws opened or closed. A channeling or grooving knife is adjustably carried by one of the heads, and when the jaws are closed upon the trunk of the tree the knife is in the position to cut the groove or channel in the bark of the tree. Means are preferably provided for yieldingly holding the handle end of the arms together to thereby yieldingly hold the jaws against the tree. When the device is in position, the movement thereof up or down the tree or around the tree causes the channeling-knife to cut the proper channel in the bark of the tree.

Referring to the drawings, Figure 1 is a front elevation of my improved implement when applied to the tree, the tree being shown in dotted lines. Fig. 2 is a side elevation of Fig. 1. Fig. 3 is in detail hereinafter described. Fig. 4 is a section on the line X X, Fig. 1. Figs. 5 and 6 are diagrams showing the application of the jaws to different-sized trees.

In this embodiment of my invention, which is the best form of my invention now known to me, I have chosen to mount the jaws and the grooving-knife upon two arms 3 and 4, which are pivoted together between their ends, as at $5^a$, thereby making a tongs-like structure which can be opened and closed, and thus readily placed in operative position on or disengaged from the tree being operated on. I have herein shown the jaws as carried by heads, one of which is adjustably supported by the end of each arm, and the grooving-knife will also be preferably supported on one of the heads. The heads are designated by 7 and are illustrated as being pivoted to their respective arms, as at 9, whereby they may be turned or swung into a position parallel with the tree-trunk. 5 5' and 6 6' designate jaws that are carried by the heads 7 and which are adapted to embrace or partially embrace the tree. I have herein illustrated each head as being provided with two jaws, as such a construction gives the device a firm grip on the tree and serves to steady it during the operation of cutting the groove. This exact construction is not essential, however, as jaws of any form or construction which will effect the result aimed at may be used without departing from my invention. As herein shown, the jaws are separate pieces from the heads and are rigidly secured thereto; but I contemplate making the jaws integral with the head if it is found to be a desirable structure. The heads are held in their adjusted positions by set-screws 10, which pass through the arms at either side of the fulcrums 9 and engage the back side of the heads. The preferred shape of the jaws is shown in Figs. 4, 5, and 6—that is, the jaws have the substantially straight end portions connected by a central curved portion, this shape being employed because it can be used on trees of different sizes, as seen in Figs. 5 and 6. I preferably bevel the upper and lower edges of each jaw, as best seen in Fig. 1, at 11, so as to permit the jaws to ride over any unevenness on the trunk of the tree as they are moved up or down.

The grooving-knife is designated by 12 and is adjustably supported on one of the heads 7. For this purpose I have in this embodiment of my invention provided the head with a hub 13, through which the stem of the holder 14 passes. The holder 14 in turn supports a supplemental holder 15, which is provided with a knife-receiving opening through which the shank 16 of the knife passes, said knife being clamped in position by the set-screw 17. This manner of supporting the knife permits it to be adjusted into any desired position, whereby a groove may be cut in any direction. The important thing is to support the knife so that it can be adjusted in this way, and while I have herein shown one way of accomplishing this my invention is not limited to this particular way of adjusting the knife, but is intended to include any suitable way. The knife-blade is curved, as shown in Figs. 2 and 4, and when adjusted will project slightly inside of the jaw and in position to cut a groove in the bark of the tree as the instrument is moved down or around the tree.

Suitable means are provided for yieldingly holding the jaws against the tree, and as herein illustrated said means comprise a cord or flexible connection 20, which passes between the guide or direction rollers 21 on the handle end of the arm 4 and through the automatic clamp comprising two jaws 23 24, which are also pivoted to said arm. The inner end of the cord has a yielding connection with the other arm, 3, and, as herein shown, is connected to one end of the spring 27, the other end of which is clamped to the arm 3 by means of the clamp 28. (See Fig. 3.) The jaws 23 and 24 are so pivoted that they bite or grip the rope 20 as the latter is drawn through the jaws toward the left, Fig. 1, but allow the rope to be freely drawn through them in the other direction. To release the jaws of the clamp from the rope, I have rigidly secured to one of the jaws a finger 25, which has a pin-and-slot connection with the other jaw.

The jaw 24 is provided with a rigid arm 29, to which a releasing-rope 30 is attached. By drawing downwardly on the releasing-rope it will be obvious that the jaws will be opened to release their grip upon the rope 20.

The inner end of the handle portion of each of the arms is provided with a socket into which an extension member 35 may be secured in order to make the arms long enough to enable the operator to lift the instrument to the proper height upon the tree. As herein illustrated, each of the handles is provided with a tapering socket 36 and also with a screw-threaded socket 37. The tapering socket is intended to be used for the support of the extension member 35, and the screw-threaded socket is intended to be used in case it is desired to secure an eye or hook or similar device to the handles.

38 designates a rope or other suitable flexible connection which is secured to an eye 39 on each handle and to which a pulling-rope 40 is secured, such rope preferably having an eye 41 in its end, through which the connection 38 passes.

43 designates a suitable spring supported between the jaw ends of the arms and tending to normally hold the jaws separated.

The arms 3 and 4 in side elevation are preferably shaped as shown in Fig. 2—that is, they are bent or offset between the head and the pivot-point 5ª, so as to carry the pivot-point to one side of the tree being operated upon.

The operation of my improvement is as follows: Before the instrument is raised to its position on the tree the clamping-knife 12 will be adjusted in its holder and the holder will be adjusted in the head so that the knife will cut a groove of the proper depth. The instrument may then be laid upon the ground and the extension-handles 35 inserted into their sockets. To raise the instrument to the proper height, ropes or similar connections are hooked into the eyes 47 in the jaw end of each arm and the instrument is swung up about the end of the extension-handles 35 as a pivot in the same manner that a ladder is raised. When the instrument has been raised into a vertical position, it will be placed so that the jaws, which it will be understood are thrown into their open position by means of the spring 43, stand on either side of the trunk of the tree at the point where it is desired to commence the cutting of the groove. The clamping rope or connection 20 will then be drawn upon and the jaws closed about the tree, the clamp 23 24 serving to automatically lock the jaws in their closed position against the trunk of the tree. The device is then in the position shown in Figs. 1 and 2. If a vertical groove is to be cut in the tree, the instrument will be pulled vertically downward by means of the pulling-rope 40, the extension-handles 35 of course being removed first. If it is desired to cut a spiral groove, the operator while pulling downwardly upon the rope 40 will gradually draw the instrument around the tree. If it is desired to cut a horizontal groove which encircles or partially encircles the tree, the extension-handles 35 may be left in the instrument in order to hold the same from being pulled downwardly and the operator will draw the instrument around the tree. It will be obvious that the canceling-knife 12 must be adjusted into the different positions for cutting grooves of different shape—that is, if it is desired to cut a vertical groove the cutting edge of the knife will have to be given a different position than if it is desired to cut either a horizontal or a spiral groove. The adjustment of the knife herein illustrated, however, provides for setting it in any desired position. As the instrument is moved around or down the tree the flexible connection 27 allows the jaws to yield slightly to correspond to any variation in the size of the tree-trunk. The jaws are therefore held constantly against the trunk, even though it varies in size. The beveled edges 11 of the jaws also permit the jaws to ride over any protuberance or roughness upon the tree. When a groove of the desired length has been cut, the releasing-rope 30 is manipulated to release the clamp 23 24, thereby permitting the spring 43 to force the jaws apart, so that the instrument can be taken from the tree.

It is desirable that the instrument should have some rest or support against the side of the tree besides that given by the jaws, and I have herein illustrated a rest or shoe 50, which is carried by the arms substantially at their pivotal point. For this purpose the pivot 5ª is shown in the form of a sleeve through which the screw-threaded stem 51 of the shoe projects. This construction provides means for adjusting the shoe for different-sized trees.

In order to work properly and have the jaws swing in a vertical plane as they are opened and closed, it is necessary to have the pivot 5ª stand in a horizontal line, as herein illustrated.

As the implement is drawn down a tree-trunk the gradually-increasing size of the trunk toward the foot of the tree causes the jaws to gradually spread, which action tends to throw the heads out of parallelism with the tree. To remedy this, I may employ a suitable spring 63, which bears against the upper end of each head and which tends to throw the said upper end of the head inward. In using the implement the lower adjusting-screws 10 will be partially withdrawn or backed off before the device is raised into position, so as to leave the head free to have a slight turning movement sufficient to compensate for the variation in the size of the tree-trunk at different places in its length. The spring 63 tends to keep the jaws at the upper ends of the heads hard against the tree.

While it is entirely within my invention to employ a single grooving-knife, yet sometimes it may be desirable to use two knives, and whenever such is the case I will provide each of the heads 7 with a holder to sustain a grooving-knife, and in the embodiment of my invention herein illustrated I have shown a grooving-knife carried by each head. It will be understood, however, that one of these knives and its holder may be omitted without departing from my invention.

I believe that I am the first to devise an instrument for the purpose of tapping or grooving sap-yielding trees which comprises a structure having jaws to embrace or partially embrace the trunk of a tree and having a grooving-knife, and therefore I desire to claim the same broadly and consider as coming within my invention any implement for this purpose and having these features, however constructed. This being so, it will be obvious that many changes in the details of the device may be made without in any way departing from my invention.

Having described my invention, what I claim as new, and desire to secure by Letters Patent, is—

1. A device for grooving or tapping rubber and other sap-yielding trees, comprising a tongs-like structure having jaws to embrace or partially embrace a tree, and a knife adapted to cut the groove in the tree.

2. In a device of the class described, a tongs-like structure having jaws to embrace or partially embrace the tree and an adjustably-supported grooving-knife adapted to cut a groove in the tree.

3. In a device of the class described, a tongs-like structure to embrace or partially embrace a tree, means to yieldingly hold said jaws in engagement with the tree, and a grooving-knife to cut a groove in the tree.

4. In a device of the class described, a pair of jaws adapted to embrace or partially embrace the trunk of a tree, means to yieldingly hold said jaws against the tree, and a grooving-knife to cut a groove in the tree.

5. In a device of the class described, a pair of arms pivoted together, jaws carried by the ends of said arms and adapted to engage the trunk of a tree, and a grooving-knife carried by one of the arms.

6. In a device of the class described, a pair of pivoted arms, jaws carried by the ends of said arms and adapted to engage the trunk of a tree, means to yieldingly hold the jaws against the tree, and a grooving-knife carried by one of the arms.

7. In a device of the class described, a pair of arms pivoted together intermediate of their ends, each of said arms carrying at one end a head having jaws to engage the trunk of a tree, and a grooving-knife supported by one of said heads.

8. In a device of the class described, a pair of pivoted arms, each of said arms having a head adjustably secured to one end thereof, jaws carried by said heads adapted to engage the tree, and a grooving-knife adjustably mounted on one of the heads.

9. In a device of the class described, a pair of jaws movable toward and from each other and adapted to engage the trunk of a tree, and an adjustably-mounted grooving-knife to cut a groove in the bark of a tree as the jaws are moved around or down the tree.

10. In a device of the class described, a pair of arms pivoted together intermediate of their ends, a head pivoted to one end of each arm, a jaw carried by each head, said jaws being adapted to engage a tree, a grooving-knife mounted on one of said heads, and means to hold each of said heads parallel with the trunk of a tree.

11. In a device of the class described, a pair of pivoted arms, a head having jaws supported on each arm, a grooving-knife on one of said heads, and means to adjust each head on its supporting-arm, whereby said heads may be given a position parallel to the trunk of the tree.

12. In a device of the class described, a pair of arms pivoted together between their ends, a jaw supported on one end of each arm, said jaws being adapted to engage the trunk of a tree, means to yieldingly connect the other end of said arms, and a grooving-knife.

13. In a device of the class described, a pair of arms pivoted together between their ends, a jaw supported on one end of each arm, the other end of the arms constituting handles, a flexible connection secured at one end to the handle end of one of the arms, and a clamp on the handle end of the other arm to engage said flexible connection, whereby the jaws are held closed against the tree, combined with a grooving-knife carried by one of said arms.

14. In a device of the class described, a pair of arms pivoted together, a jaw supported on one end of each arm, the other end of the arms constituting handles, a cord having an elastic connection with the handle end of one arm and a clamp on the handle end of the other arm to engage said cord, combined with a grooving-knife carried by one of said arms.

15. In a device of the class described, a pair of arms pivoted together, a jaw supported by each arm, a grooving-knife carried by one arm, and extension-handles adapted to be connected to the arms, whereby the instrument may be lifted to the desired height.

16. In a device of the class described, a pair of arms pivoted together, a jaw supported by each arm, said jaws being adapted to engage the tree-trunk, a grooving-knife, means tending normally to separate the jaws, and means to hold the jaws closed against the tree.

17. In a device of the class described, a pair of arms pivoted together, jaws carried by the ends of said arms and adapted to engage the trunk of a tree, a grooving-knife, a clamping-rope secured to one arm, and an automatic clamp to engage said rope and hold the jaws closed.

18. In a device of the class described, a pair of arms pivoted together, jaws carried by the ends of said arms and adapted to engage the trunk of a tree, a grooving-knife, a clamping-rope secured to one arm, an automatic clamp to engage said rope and hold the jaws closed, and manually-controlled means to release the jaws of the clamp.

In testimony whereof I have signed my name to this specification in the presence of two subscribing witnesses.

FAYETTE S. ROBINSON.

Witnesses:
LOUIS C. SMITH,
GEO. W. GREGORY.